Oct. 14, 1958 W. F. BUNSEN ET AL 2,856,207
DUCT WITH RESILIENTLY BIASED BALL AND SOCKET JOINT
Filed March 5, 1956 2 Sheets-Sheet 1

INVENTORS.
W. F. BUNSEN
R. B. LANE
BY
S. Tierney Jr.
ATTORNEY

Oct. 14, 1958     W. F. BUNSEN ET AL     2,856,207
DUCT WITH RESILIENTLY BIASED BALL AND SOCKET JOINT

Filed March 5, 1956     2 Sheets-Sheet 2

INVENTORS.
W. F. BUNSEN
R. B. LANE
BY
S. Tierney Jr.
ATTORNEY

United States Patent Office 2,856,207
Patented Oct. 14, 1958

2,856,207

DUCT WITH RESILIENTLY BIASED BALL AND SOCKET JOINT

William F. Bunsen, Spring Valley, and Robert B. Lane, San Diego, Calif., assignors to Rohr Aircraft Corporation, Chula Vista, Calif., a corporation of California Application March 5, 1956, Serial No. 569,513

3 Claims. (Cl. 285—268)

This invention relates to a duct adapted to convey a stream of hot or cold gas from one member to another and wherein one of the members is movable angularly or longitudinally or both with reference to the other. The duct is especially adapted for use on airplanes to convey hot compressed air from an air compressor to auxiliary devices driven by compressed air, to cabin heaters, anti-icing devices or other pressurized equipment on the plane.

An object of the invention is to provide a duct of the type described wherein two duct sections are connected by a ball and socket joint wherein a spring is provided to maintain the ball and socket members in firm contact with each other at all times.

Another object is to provide a spring construction which applies a substantially uniform pressure of the socket against the ball for all the different angular positions the ball may take with reference to the socket.

A further object is to provide ball and socket members of the same material and wherein a ring of much harder material is secured to the socket by welding, this ring then being machined to provide a curved face which is the only region of contact of the socket with the spherical face of the ball.

A further object is to provide a duct structure having a slip joint between two tubular members having sliding contact with each other and a novel type of sealing means for preventing escape from the duct of any gas which leaks through the slip joint.

Other objects will become apparent as the description of our novel duct system proceds. For a better understanding of the invention reference is made to the accompanying drawing, in which.

Figure 1:
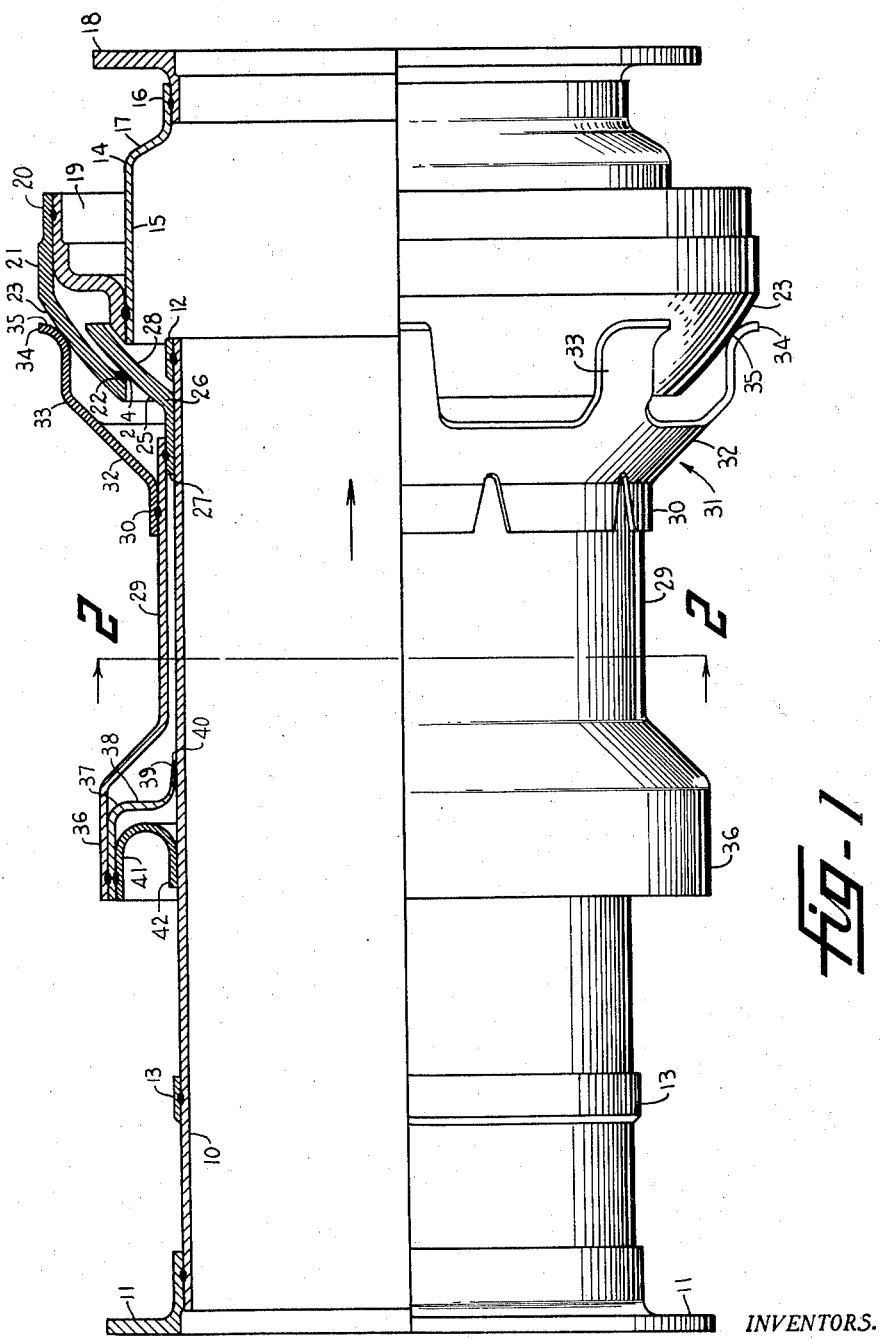
Fig. 1 is a front view, partly in section, of a duct embodying the invention.
Figure 2:
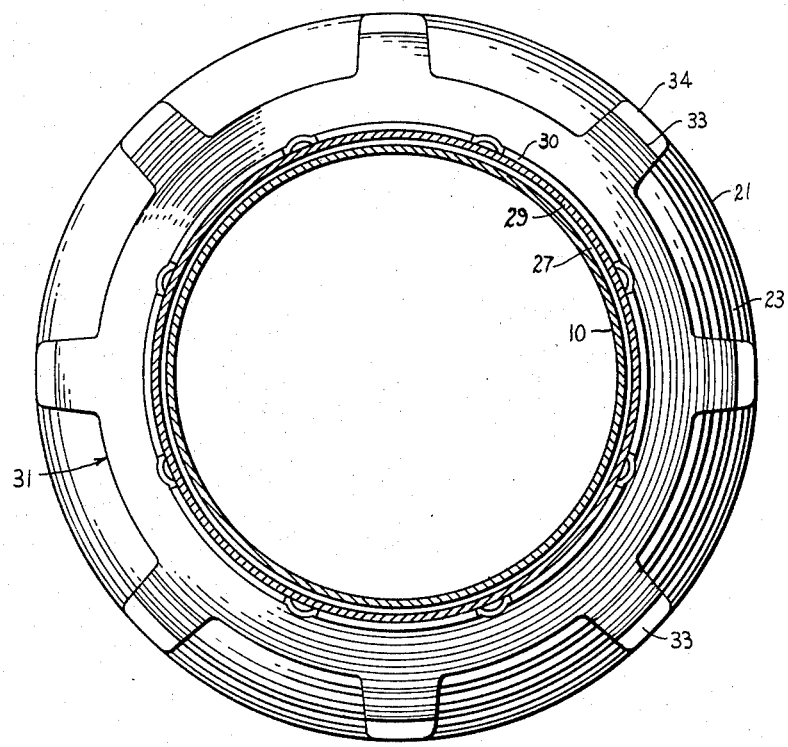
Fig. 2 is a sectional view through the duct taken on line 2—2 of Fig. 1.

The duct comprises a cylindrical thin walled tube 10 to one end of which a flange 11 is welded and to the opposite end of which a stop in the form of a circular ring 12 is welded. A second stop ring 13 is welded to tube 10, the gas from which traveling in the direction of the arrow shown passes into a second tube 14 which is connected with tube 10 by a ball and socket and also a slip joint connection to be described. Tube 14 has a long cylindrical portion 15 which is connected with its cylindrical downstream end 16 by an inwardly converging portion 17. End 16 has a terminal flange 18 welded thereto. Welded to tube 14 at its upstream end is a socket support of retainer 19 or the shape shown, the cylindrical end 20 of socket 21 being welded to the periphery of support 19. A thin groove (not shown) is cut in the inner end of socket 21 and a mass of Stellite melted and deposited in the groove and built up to form a continuous ring 22 which protrudes inwardly beyond the main body of the socket. The Stellite is a cobalt, chromium, tungsten alloy much harder than the stainless steel of which the other parts of the duct are made. After ring 22 is welded to socket 21 and before the socket has been secured to its support 19, the socket is placed in a grinding machine and its outer face 23 ground to spherical shape. While in the grinder, the inner face of ring 22 is ground to the shape shown to provide a tip portion having a convex face 24 which has line contact along a circle with the spherical face 25 of ball member 26. The ball 26 has a cylindrical sleeve 27 whose inner cylindrical face has sliding contact with the peripheral face of tube 10 and an outwardly flaring skirt 28 whose outer face 25 has been ground to spherical shape. After grinding, face 25 is preferably plated with a thin film of hard chromium (not shown).

A tube 29 surrounds tube 10 and is spaced therefrom, the downstream end of tube 29 being welded to sleeve 27 and also to the generally cylindrical end 30 of a spring 31. The main body portion 32 of spring 31 is rigid and is flared outwardly as shown to carry a plurality of spaced apart resilient spring fingers 33. Near its downstream end 34 each spring finger is bent to arcuate shape, as shown, to provide an inner convex face 35 which has substantially point contact with the spherical face 23 of the socket.

The upstream end of tube 29 is flared out as shown and terminates in a cylindrical portion 36 to which is welded an annular sealing member 37. Member 37 has an inwardly extending radial portion 38 which terminates in a thin flexible tongue 39 the tip 40 of which is rounded off and presses against the outer face of tube 10 to make a sealed joint therewith. The front portion of the tongue is inclined at an angle of only about 4 degrees to the outer surface of tube 10 and due to this small inclination and the convex curvature of end 40, the tongue does not gouge into the surface of tube 10 as it slides along this surface even in the presence of substantial gas pressure on the tongue. Due to the controlled thickness and inclination of tongue 39, a flexibility is provided that permits small radial displacement of the outer surface of tube 10 due to changes in temperature, manufacturing tolerances or other reason without giving a permanent set to the tongue or causing gas leakage.

Welded to the inside of member 37 is a ring 41 of U-shaped cross section having a cylindrical portion 42 preferably spaced a slight distance from the outer face of tube 10 or having a loose sliding fit thereon. Ring 41 thus serves as a stop to limit the movement of tube 10 toward flange 18 by stop ring 13 abutting against ring portion 42. Also any large radial motion of flange 11 due to vibration of an air compressor or other member to which the flange was attached could not bend tongue 39 by an amount sufficient to damage the tongue by giving it a permanent set since the radial thrust would be taken up by ring 41 as soon as tube 10 came in contact with cylindrical portion 42 thereof.

As above mentioned the duct can be used to transmit hot or cold pressurized gas from a source to any device in which the gas is to be utilized and is especially adapted for use in the pneumatic systems of airplanes. For example, if flange 11 is connected to the outlet of an air compressor delivering air at a pressure of 300 p. s. i. and temperature of 700° F., by connecting flange 18 to the device in which the air is to be utilized, it will be apparent that the ball and socket joint permits the tilting of flange 18 and tube 15 by at least 5 degrees in any direction without any substantial leakage from the duct. As flange 18 is tilted and the convex face 24 of ring 22 slides along spherical face 25 of ball 26, the spring fingers 33 keep the ring pressed against face 25 with a uniform pressure sufficient to prevent leakage. Similarly if flange 11 is repeatedly tilted through a small angle due to vibration of the air compressor to which it is attached, ball 26 and spring 31 move through the same angle and the spring keeps ring 22 biased against spherical ball face 25 with a uniform pressure to maintain a sealed joint. It will also be clear that any endwise motion of tube 10 inside ball 26 due to vibration of the air compressor, expansion of tube 10 due to a rise in temperature, or other reason is accommodated by the slip joint described between tube 10 and ball 26.

While the gas flow has been described as in the direction of the arrow for convenience, it will be understood that the duct is capable of conveying gas in the opposite direction substantially as well. By making all parts of the duct except ring 22 of stainless steel, it is capable of conveying gas at high temperatures and of widely different pressures without any substantial leakage and can be used for a long time without requiring any repairs.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. A duct adapted to convey a stream of gas under pressure comprising, first and second rigid tubes; a sleeve welded to the end of the first tube, said sleeve having an outwardly flared skirt whose outer peripheral surface is spherical; a socket welded to the end of the second tube, said socket having an outer spherical peripheral face and an integral inwardly extending annular portion in contact with the spherical surface of said skirt; and an annular member surrounding the end of said first tube and welded thereto, said annular member being provided with a plurality of spaced apart spring fingers pressing against the said outer spherical peripheral face of said socket to thereby press the annular portion of said socket against the spherical surface of said skirt, each of said spring fingers having a convex face in contact with the outer spherical face of said socket.

2. A duct adapted to convey a stream of gas under pressure comprising, first and second rigid tubes; a sleeve welded to the end of the first tube, said sleeve having an outwardly flared skirt whose outer peripheral surface is spherical; a socket welded to the end of the second tube and flared inwardly along said spherical surface of said skirt, said socket having an outer spherical peripheral face terminating in an integral inwardly extending annular portion having a convex face in circular line sliding contact with said spherical surface of said skirt; and an annular member surrounding the end of said first tube and welded thereto, said annular member being provided with a plurality of spaced apart spring fingers pressing against the said outer spherical peripheral face of said socket to thereby press the annular portion of said socket against the spherical surface of said skirt.

3. A duct adapted to convey a stream of gas under pressure comprising a first rigid tube terminating in an outwardly flared skirt whose outer peripheral surface is spherical, a second rigid tube terminating in a socket flared inwardly along said spherical surface of said skirt, said socket having an outer spherical peripheral face terminating in an integral inwardly extending ring in sliding contact with said spherical surface of said skirt, and a cylindrical spring sleeved on said first tube and secured thereto, said spring having an outwardly flared portion terminating in a plurality of circumferentially spaced apart spring fingers pressing against said outer spherical face of said socket to thereby press said ring of said socket against the spherical surface of said skirt in sealing engagement therewith.

References Cited in the file of this patent

UNITED STATES PATENTS

| | | |
|---|---|---|
| 795,564 | Turner | July 25, 1905 |
| 872,121 | Greenlaw | Nov. 26, 1907 |
| 2,117,152 | Crost | May 10, 1938 |
| 2,493,404 | Haynes | Jan. 3, 1950 |
| 2,556,659 | Patterson | June 12, 1951 |
| 2,712,456 | McCreery | July 5, 1955 |
| 2,781,205 | Lane et al. | Feb. 12, 1957 |

FOREIGN PATENTS

| | | |
|---|---|---|
| 11,262 | Great Britain | 1906 |
| 379,896 | France | Sept. 21, 1907 |
| 510,417 | France | Sept. 4, 1920 |
| 613,369 | Great Britain | Nov. 25, 1948 |